Patented Dec. 27, 1938

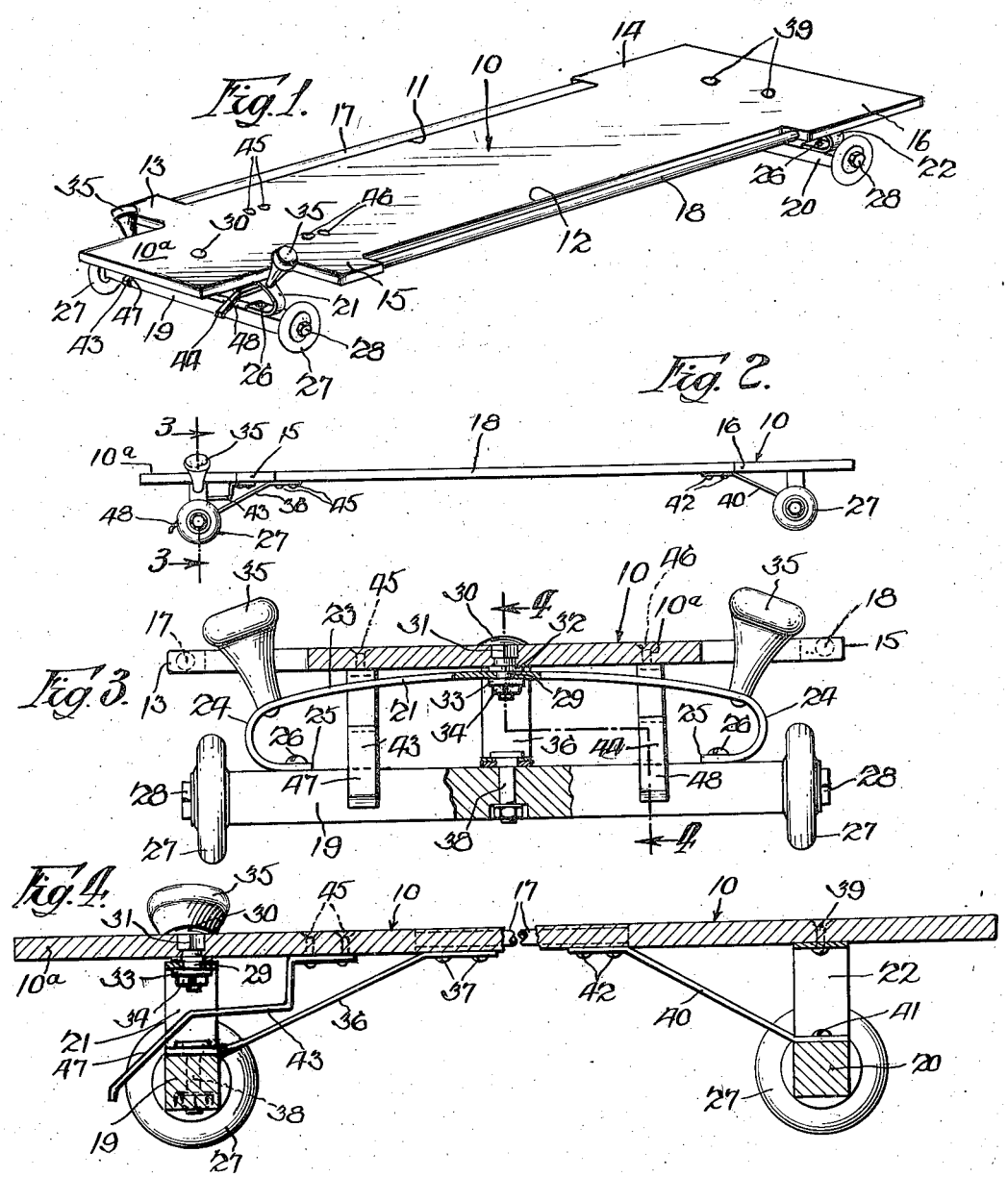

2,141,509

UNITED STATES PATENT OFFICE 2,141,509

COASTER

Samuel L. Brody, Chicago, Ill.

Application September 26, 1938, Serial No. 231,728

8 Claims. (Cl. 280—87.01)

This invention relates to improvements in a coaster, and is more particularly directed to a type that is strong in construction, light in weight, easily carried about and on which a child may lie prone while coasting and steering the same.

More particularly, the invention is concerned with providing improved front and rear spring means and improved front end assembly for a coaster of such construction that the coaster is very strong to withstand shocks and various abuses to which it is subjected, while being relatively light in weight whereby a child may easily carry and run with the same for coasting purposes.

The chief objects of the present invention are the provision of a coaster that is light in weight, simple and strong in construction, inexpensive to manufacture, and which is provided with resilient means between the running gear and the bed on which the child rests.

A further object is the provision of means for automatically guiding and controlling the coaster by the action of the body while lying prone thereon.

Another object is the provision of means for manually controlling to steer the coaster including means for automatically guiding the wheels in a straight line.

Referring to the drawing:

Figure 1 is a perspective view of the coaster.

Figure 2 is a side elevation of the same.

Figure 3 is an enlarged front elevation showing portions broken away, substantially on the line 3—3 of Figure 2; and Figure 4 is an enlarged medial longitudinal sectional view with the center portion broken away.

The reference numeral 10 designates the bed on which the child may lie prone or in a sitting position and which bed is provided with relieved portions 11 and 12, respectively, along each side thereof forming projections 13—14 and 15—16, respectively, at the front and rearward ends of the bed. Between each of the pairs of projections 13—14 and 15—16 are fixed longitudinally extending bars 17 and 18, respectively, which serve to reinforce the bed 10 and also as hand grips by which the coaster may be bodily carried.

Below the forward and rearward ends of the bed 10 and extending transversely thereof are a pair of axles 19 and 20, which are resiliently attached to the bed 10 by means of springs 21 and 22, respectively, and which springs are of strong construction and formed to permit of their resilient action. As both the springs 21 and 22 are substantially of the same shape and appearance, an illustration of one is thought to suffice for an illustration of both. These springs 21 and 22 have their body portions 23 arched and their end portions are turned back to form semi-circular loops 24—24 and their extreme free ends 25—25 are directed inwardly and secured to the axle at 26—26. In this construction of spring, it will be noted that the arched body portion 23 and semi-circular loops 24—24 provide for the yield of the spring while the extreme ends 25—25 of the spring are fixedly secured to the axle. This construction also eliminates the use of toggles and toggle bolts while permitting of a very yieldable and resilient spring construction. Each of the axles 19 and 20 are provided with rubber-tired wheels 27 which are preferably provided with anti-friction bearings and secured to the ends of the axles in any suitable manner such as by means of bolts 28. The wheels 27 may be of a type having inflated tires to add additional resiliency to the coaster.

The front spring 21 is provided intermediate its length with a hole 29 through which a bolt 30 extends, and which bolt is provided near its head with a square shank 31 to retain the bolt from turning movements in the bed 10. A collar or spacing washer 32 is positioned on the bolt 30 between the bed 10 and spring 21 and a washer 33 and a lock nut 34 are fixed to the end of the bolt 30 for pivotally securing the spring 21 in position to the bed 10. At near each end of the spring 21 and just inwardly of the semi-circular loops 24—24 thereof is a pair of hand grips 35—35 which extend an appreciable distance above the bed 10 to permit a child to firmly grasp the grips to steer the coaster while lying prone on the bed thereof. The portion of the bed forwardly of the projections 13 and 15 is relieved to form a relatively narrow projecting portion 10a on either side of which the hand grips 35 extend, and this projection 10a is of a width to permit of clearance for the hand grips during the pivotal movements of the front axle. The front axle 19 is also supported against road shock and obstructions which are encountered during the coasting movements of the coaster, and this means comprises a relatively flat and resilient arm 36 which is anchored at 37 to the underneath surface of the bed 10 and the other end of the arm 37 is anchored to the axle 19 by a bolt 38. The bolt 38 is positioned intermediate the length of the axle and is aligned directly below the bolt 30 which permits of the pivotal movements of the axle with the spring 21. This construction permits of a resiliency between the axle and bed while serving to maintain alignment of bolts 30 and 38 for the pivotal movement of the axle 19.

The rear spring 22 is of the same shape as the front spring 21 and is secured to the rear axle 20 in the same manner as that described for the front axle but in this instance, the spring 22 is fixedly secured at 39 to the bed 10. This rear spring 22 is also supported against road shock and obstructions encountered during the coasting action of the coaster by means of a relatively flat and resilient arm 40 which has one end secured at 41 to the axle 20 and its other end secured at 42 to the bed 10. The resilient arm 40 serves to retain the axle 20 aligned with its spring 22 while permitting of a resiliency between the axle 20 and bed 10.

As thus far described, it will be seen that with a coaster constructed in this manner, a child may take hold of the longitudinal bars 17 and 18 at any position thereon and bodily carry the coaster which is of relatively light construction and run with the same. While running, the child may cause the wheels 28 of the coaster to engage the surface on which the coaster is to be operated and then the child may let its weight fall and rest on the bed 10 and lie prone thereon. As the weight of the body drops on the coaster, the springs 21 and 22 will absorb the shock and while the coaster is in motion, the springs will also absorb the shock of an irregular surface or small obstructions on which the coaster is being used. During this coasting movement, the child may grasp the hand grips 35 to pivotally swing the front axle 19 to guide the coaster and to turn sharp corners.

Means is also provided for automatically guiding the coaster without resorting to the use of the hand grips 35. This means comprises a pair of members 43 and 44 arranged an equal distance on each side of the bolt 30 and secured at one of their ends to the bed 10 at 45 and 46, respectively. The free ends of each of the members 43 and 44 are angularly directed forwardly and downwardly and in front of axle 19 to provide cam surfaces 47 and 48, respectively, on each side of the pivotal centers formed by bolts 30 and 38. The cam portions 47 and 48 of each of the members 43 and 44 are normally in spaced relation with the front axle 19. When the weight of the child is on the bed 10, springs 21 and 22 will yield and this yielding action of the springs permits bed 10 to carry the members 43 and 44 therewith, which positions the cam surfaces 47 and 48 thereof to engage the front axle 19. While the child is coasting and lying prone on bed 10, it is then only necessary for the child to move its body to one side or the other of bed 10 which causes the bed to rock to the side having the greatest weight, and this rocking movement of bed 10 effects a sliding movement of cam 47 or cam 48 to swing one end or the other of axle 19 rearwardly. This movement of the body from side to side is easily accomplished while lying prone on bed 10 and serves to control the front axle 19 to guide the coaster.

It will be noted, that as the bed 10 is rocked from one side to the other, the cam surfaces 47 and 48 are intermittently engaged with the axle 19 and the cam on the side of the bed tilted being the one that engages the axle to swing the same and the other cam being then carried out of engagement from the axle.

While coasting in a substantially straight line, the two cams 47 and 48 are in engagement with the axle 19 caused by the weight of the child on bed 10 and while the cams are relatively resilient to permit of a springing action of the bed, a very slight rocking movement of the bed is required to guide the coaster.

The springs 21 and 22 are secured to the bed 10 substantially on the longitudinal axis of the bed permitting of its rocking movements while remaining constantly resilient with respect to running gear.

While I have shown a preferred embodiment of my invention, I contemplate as being included in these improvements all such changes, variations and departures from what is thus specifically illustrated and described as fall within the scope of the appended claims.

I claim:

1. A coaster of the character described comprising a bed, an axle supported at near each end of said bed, wheels at the ends of each axle, resilient means between each of said axles and the bed, one of said resilient means being arranged in pivotal relation to said bed, means adapted to swing the axle about its its pivot to steer the coaster when said means is manually moved, and means coacting with said axle and effective when a weight is placed on the bed for automatically and releasably retaining the axle to retain the wheels in alignment.

2. A coaster of the character described comprising a bed, an axle supported at near each end of said bed, wheels at the ends of each axle, resilient means between each of said axles and the bed, one of said resilient means being arranged in pivotal relation to said bed, means for swinging said axle about its pivot to steer the coaster, angularly directed means in juxtaposition with said axle and engageable thereby for effecting pivotal movement of the axle by a rocking movement of the bed.

3. A coaster of the character described comprising a bed, an axle supported at near each end of said bed, wheels at the ends of each axle, resilient means between each of said axles and the bed, one of said resilient means being arranged in pivotal relation to said bed, means adapted to swing the axle about its pivot to steer the coaster when said means is manually moved, means between the said axle and bed pivotally guiding the axle, said means resisting road shock to the axle while permitting of its free movement.

4. A coaster of the character described comprising a bed, an axle having wheels at each end thereof and supported at near each end of said bed, a spring between each of said axles and the bed, one of said springs being in pivotal relation with said bed, manually manipulative means for swinging said axle about its pivot to steer the coaster, means on the bed and adapted to coact with said axle and engageable therewith for swinging the axle to guide the coaster upon a rocking of the bed.

5. A coaster of the character described, comprising in combination, a bed, an axle having wheels thereon and supported at near each end of said bed, a semi-eliptical spring between each of said axles and the bed, one of said springs being arranged in pivotal relation to said bed, means adapted to swing the axle about its pivot to steer the coaster when the said means is manually moved, means between the said axle and bed pivotally guiding the axle, said means comprising a yieldable member resisting road shock to the axle while permitting of its free movement.

6. A coaster of the character described, comprising in combination, a bed, bars extending longitudinally on each side of the bed, an axle having wheels at each end thereof and supported at near each end of and beneath said bed, a spring between each of said axles and the bed and fixedly secured to the axle, one of said springs being in pivotal relation with said bed, manually manipulative means on said last-mentioned spring for swinging said axle about its pivot, means on the bed frictionally engaging said axle for swinging the axle to guide the coaster upon a rocking movement of the bed.

7. A coaster of the character described, comprising in combination, a bed having bars extending longitudinally on each side thereof, an axle arranged at near each end of and beneath said bed, wheels on said axles, a spring between each of said axles and the bed, one of said springs being in pivotal relation with said bed, means on said last-mentioned spring for swinging said axle about its pivot, means on the bed normally out of engagement with said axle but adapted to engage therewith to swing the axle to guide the coaster upon a rocking movement of the bed.

8. A coaster of the character described, comprising in combination, a bed, an axle having wheels thereon and supported at near each end of said bed, a semi-eliptical spring between each of said axles and the bed, one of said springs being pivoted to said bed, means on said spring for swinging the same and axle about its pivot, yieldable means between the said axle and bed pivotally guiding the axle and resisting road shock thereto while permitting of its free movement.

SAMUEL L. BRODY.